(12) United States Patent
Huguenard

(10) Patent No.: US 12,498,261 B1
(45) Date of Patent: Dec. 16, 2025

(54) SYSTEMS AND METHODS FOR FILL LEVEL DETECTION

(71) Applicant: Kimberly-Clark Worldwide, Inc., Neenah, WI (US)

(72) Inventor: Austin Huguenard, Atlanta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 18/871,178

(22) PCT Filed: Jun. 14, 2024

(86) PCT No.: PCT/US2024/034061
§ 371 (c)(1),
(2) Date: Dec. 3, 2024

(51) Int. Cl.
*G01F 23/22* (2006.01)
*A47K 5/12* (2006.01)
*A47K 5/14* (2006.01)
*G01P 15/18* (2013.01)

(52) U.S. Cl.
CPC ............... *G01F 23/22* (2013.01); *A47K 5/12* (2013.01); *A47K 5/14* (2013.01); *G01P 15/18* (2013.01)

(58) Field of Classification Search
CPC ........ G01F 23/263; G01F 23/80; G01F 23/18; G01F 23/804; G01F 23/268; G01F 23/22; A47K 5/12; A47K 5/14
See application file for complete search history.

(56) References Cited

U.S. PATENT DOCUMENTS

| | | | | |
|---|---|---|---|---|
| 3,825,154 | A * | 7/1974 | Jaeger | B67D 1/10 417/63 |
| 5,988,440 | A * | 11/1999 | Saunders | A47K 5/1217 222/63 |
| 6,053,361 | A * | 4/2000 | Hills | B67D 1/1247 417/63 |
| 6,205,855 | B1 | 3/2001 | Pfeiffer | |
| 6,669,051 | B1 * | 12/2003 | Phallen | B67C 3/28 222/394 |
| 6,929,150 | B2 | 8/2005 | Muderlak et al. | |
| 8,100,299 | B2 | 1/2012 | Phelps et al. | |
| 10,745,263 | B2 | 8/2020 | Crouse et al. | |

(Continued)

FOREIGN PATENT DOCUMENTS

| | | |
|---|---|---|
| EP | 3135617 A1 | 3/2017 |
| WO | WO2009118542 A1 | 10/2009 |
| WO | WO2019089840 A1 | 5/2019 |

OTHER PUBLICATIONS

PCT Search Report Corresponding to Application No. PCT/US2024/034061 on Aug. 13, 2024.

(Continued)

*Primary Examiner* — Helen C Kwok
(74) *Attorney, Agent, or Firm* — Dority & Manning, P.A.

(57) ABSTRACT

A fill level detection system includes a pumphouse and a container connectable to the pumphouse. A vibration generator and an accelerometer are mounted to the pumphouse. A controller is in signal communication with the vibration generator and the accelerometer. The controller is configured for activating the vibration generator and the accelerometer, accessing acceleration data, deactivating the vibration generator and the accelerometer, and transmitting the acceleration data for analysis to compute a fill level of fluid in the container.

20 Claims, 6 Drawing Sheets

(56) References Cited

U.S. PATENT DOCUMENTS

| | | | |
|---|---|---|---|
| 11,543,281 B1* | 1/2023 | Lipscomb | G01P 15/18 |
| 2006/0042386 A1 | 3/2006 | Young et al. | |
| 2007/0009365 A1* | 1/2007 | Litterst | B67D 1/1231 |
| | | | 417/44.1 |
| 2009/0019835 A1* | 1/2009 | Dingle | F01N 11/00 |
| | | | 417/44.1 |
| 2010/0206066 A1 | 8/2010 | Elofsson et al. | |
| 2012/0096939 A1 | 4/2012 | Mökander | |
| 2012/0260729 A1 | 10/2012 | Bayley et al. | |
| 2014/0107835 A1* | 4/2014 | Biasi | B67D 1/0892 |
| | | | 700/231 |
| 2017/0055760 A1* | 3/2017 | Burrows | F04B 49/065 |
| 2019/0314843 A1 | 10/2019 | Nour-Omid et al. | |
| 2019/0328945 A1* | 10/2019 | Analytis | G01F 23/26 |
| 2020/0087836 A1 | 3/2020 | Beckley | |

OTHER PUBLICATIONS

Icon Process Controls, How Does Tank Level Sensors Work?, Retrieved from https://iconprocon.com/blog-post/how-does-tank-level-sensors-work/#:~:text=Vibrating%20fork%20level%20sensors%3A%20These,vibration%20changes%2C%20indicating%20the%20level., Jan. 14, 2023.

* cited by examiner

SYSTEMS AND METHODS FOR FILL LEVEL DETECTION

RELATED APPLICATIONS

The present application is the national stage entry of International Patent Application No. PCT/US2024/034061 having a filing date of Jun. 14, 2024, which is incorporated herein in its entirety by reference thereto.

BACKGROUND

A wide variety of liquid dispensers, such as counter-mounted or "in-counter" liquid dispensers, wall-mounted dispensers or stand-alone dispensers, are known in the art. Timing refilling of such fluid dispensers can be difficult. In some dispensing systems, refills are completed by removing an empty reservoir and replacing the empty reservoir with a replacement reservoir filled with liquid product. However, maintenance personnel will often replace reservoirs before they are empty, which can result in product waste. At other times, maintenance personnel may not replace the product reservoir in a timely manner, which causes no product to be available for restroom patrons.

Systems and methods to refill product dispensers that results in less product waste and improved patron satisfaction would be useful.

SUMMARY

In general, the present disclosure is directed to systems and methods for determining the product level of a container attached to a soap dispenser. The systems and method may utilize an accelerometer and a vibration generator that are both attached to a pumphouse of the soap dispenser. The accelerometer and vibration generator may both turn on in unison, and the accelerometer may capture the vibrations from the vibration generator and record the data. This data may be sent to a computing device, which may process the data to make a product level prediction. After capturing the vibrations with the accelerometer, the accelerometer and vibration generator may both be turned off to conserve power. Moreover, the accelerometer and vibration generator may be activated periodically or on demand to determine the product level of the container and otherwise remain deactivated to conserve power.

In one example embodiment, a fill level detection system includes a pumphouse. A container is connectable to the pumphouse such that the pumphouse is operable to pump fluid from the container to a dispenser. A vibration generator is mounted to the pumphouse. The vibration generator is operable to vibrate the pumphouse. An accelerometer mounted to the pumphouse. The accelerometer is configured to measure acceleration of the pumphouse. A controller is in signal communication with the vibration generator and the accelerometer. The controller is configured for: activating the vibration generator and the accelerometer; accessing acceleration data for the pumphouse, the acceleration data corresponding to when the vibration generator is activated to vibrate the pumphouse; deactivating the vibration generator and the accelerometer; and transmitting the acceleration data for analysis to compute a fill level of the fluid in the container.

In another example embodiment, a method for fill level detection includes: activating a vibration generator and an accelerometer mounted to a pumphouse, the pumphouse is operable to pump fluid from a container to a dispenser on the countertop; accessing acceleration data for the pumphouse from the accelerometer while the vibration generator is activated to vibrate the pumphouse; deactivating the vibration generator and the accelerometer; and computing, based on the acceleration data, a fill level of the fluid in the container.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
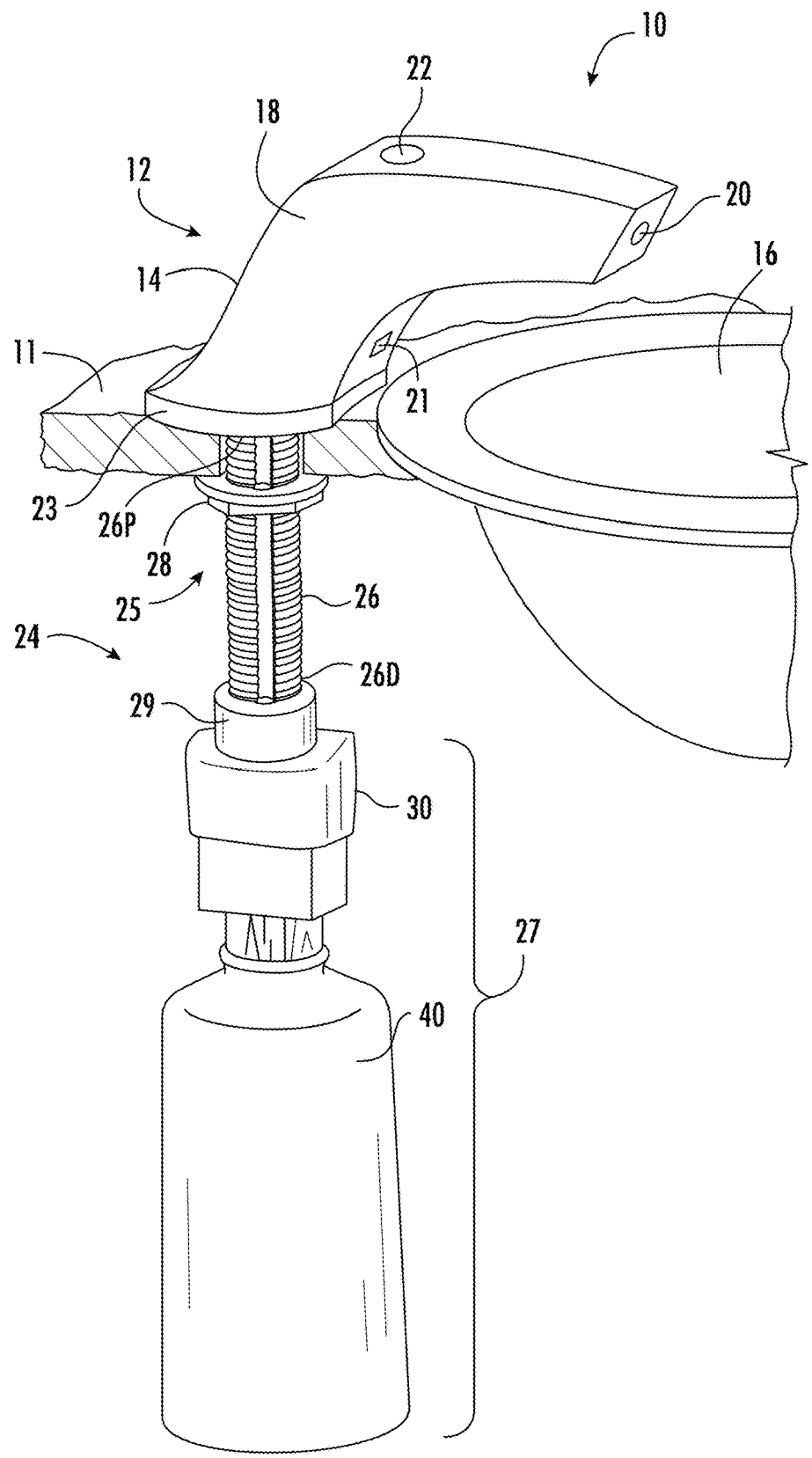
FIG. 1 is a perspective view of a dispenser system according to example aspects of the present disclosure.
Figure 2:
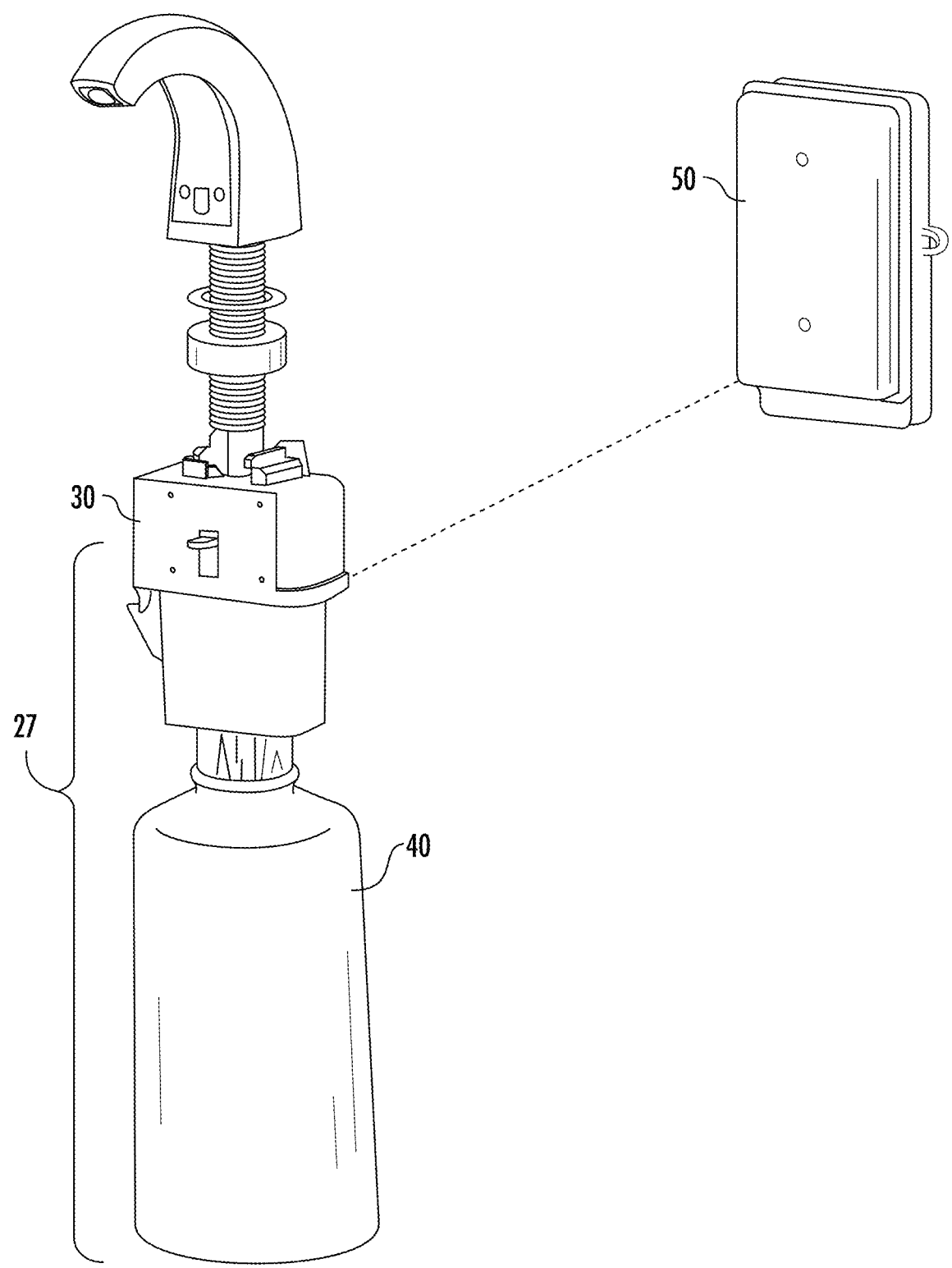
FIG. 2 is another perspective view of the example dispenser system of FIG. 1.

Repeat use of reference characters in the present specification and drawings is intended to represent the same or analogous features or elements of the present invention.

DETAILED DESCRIPTION

The following description should be read with reference to the drawings in which similar elements in different drawings are numbered the same. The description and the drawings, which are not necessarily to scale, depict illustrative embodiments and are not intended to limit the scope of the disclosure.

Although some suitable dimensions, ranges and/or values pertaining to various components, features and/or specifications are disclosed, one of skill in the art, incited by the present disclosure, would understand desired dimensions, ranges and/or values may deviate from those expressly disclosed.

When introducing elements of the present disclosure or the preferred embodiment(s) thereof, the articles "a", "an", "the" and "said" are intended to mean that there are one or more of the elements. As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

Each example is provided by way of explanation and is not meant as a limitation. For example, features illustrated or described as part of one embodiment or figure can be used on another embodiment or figure to yield yet another embodiment. It is intended that the present disclosure include such modifications and variations.

Many modifications and variations of the present disclosure can be made without departing from the spirit and scope thereof. Therefore, the exemplary embodiments described above should not be used to limit the scope of the invention.

Dispenser System:

The dispenser systems disclosed herein are suitable for dispensing a liquid product, such as hand soap, hand sanitizer, and other personal care products. While the term "liquid product" is used, the disclosure is not so limited. Indeed, the product dispensed could be a viscous liquid, such as hand soap, or a foam product, such as foamed hand soap. The disclosure is intended to cover a variety of liquid products that can be dispensed in a viscous or foamed state. Furthermore, while example embodiments described herein provide an in-counter mounted dispenser, the disclosure is not so limited. Indeed, the reservoir assembly disclosed herein may be incorporated on any number or types of liquid product dispensers where a refill reservoir is necessary. For example, the reservoir assembly provided herein could be utilized on wall-mounted liquid product dispensers and/or stand-along liquid product dispensers.

FIG. 1 illustrates a dispenser system 10 according to example aspects of the present subject matter. In FIG. 1, the dispenser system 10 is mounted in a counter 11 of a washroom facility. As shown, the dispenser system 10 may include a dispenser fixture 12 having an above-counter portion 14 located adjacent to a sink bowl 16. As shown, above-counter portion 14 includes a dispensing head 18 having a delivery spout 20 extending from the dispensing head 18. Delivery spout 20 is positioned and configured in a conventional manner to supply soap, liquids, or foams to the hand of a user. As shown, the delivery spout 20 is positioned over the sink bowl 16, so that in an event that the liquid product is unintentionally dispensed from the dispensing apparatus, the liquid product flow into the sink bowl 16, rather than the counter 11.

To dispense the liquid product from the dispenser system, a user presses an actuation button 22, which in turn activates a pump and a quantity (i.e., dose) of the liquid product is delivered to the user's hand. Alternatively, the dispenser system 10 may have a sensor 21, positioned such that the sensor 21 is configured detect the hands of a user under the delivery spout 20. When the sensor 21 detects the user hand under the delivery spout 20, the pump activates to dispenser the quantity of liquid product to the user's hand. Generally, the actuator button 22 and/or the sensor 21 are electrically connected to a controller 110 (FIGS. 3 and 4) having control circuitry, which is used to detect a user's hand near under the spout 20 or the user's input to the actuator button 22. In addition, the controller 110 may be configured to activate the motor and/or a pump for a given period of time so that the user receives a dose, such as a specific pre-determined amount, of the liquid product. Controllers for sensors and actuator buttons are known to those skilled in the art and are shown, for example in U.S. Pat. No. 6,929,150 to Muderlak et al., which is hereby incorporated by reference.

The controller 110 may regulate and monitor functions of the dispenser system 10. The controller 110 may be configured to communicate information regarding the dispenser system 10 to a server system 106 (FIG. 4) and/or computing device 108 (FIG. 4) via wired and/or wireless communications networks. Communication from the controller 110 and other system components may be accomplished through wired-connections or wireless connections, (e.g., Bluetooth Low Energy (BLE) protocol). Wireless communications between components of the dispenser system 10 can also be established via other wireless protocol, such as by cellular communications.

The dispenser fixture 12 also includes an under-counter portion 24 having a mounting system 25 securing the dispenser fixture 12 to the counter. The mounting system 25 may include a hollow elongated tube extending through a hole defined in counter 11. By "hollow", it is intended that a tube has a passage or channel (not shown in FIG. 1) that extends through the elongated tube 26 from proximate end 26P of the elongated tube 26, which is located above the counter 11, to the distal end 26D of the elongated tube 26 located below the counter 11. The elongated tube 26 may have has a flange 23 on the end of the elongated tube that is positioned above the counter 11. The flange may be sized larger than the hole in the counter 11, and the flange 23 may serve to keep the elongated tube 26 from falling through the counter 11. As is shown in FIG. 1, the mounting system 25 may also include an anchor 28 associated with the portion of the elongated tube 26 extending below the counter 11. The mounting system 25 shown in FIG. 1 is one type of mounting system suitable for the present subject matter. It is noted that other types of mounting systems may also be used in place of the mounting system 25 shown in FIG. 1.

The under-counter portion 24 includes a reservoir assembly 27 containing a pumphouse 30 and a container 40 for holding a quantity of liquid product. In example embodiments, an interior volume of the container 40 may be no greater than two liters (2 L), such as no greater than one liter (1 L). Such sizing of the container 40 may advantageously allow container 40 to be easily mounted below the counter 11 while also allowing easy refilling or replacement by maintenance personnel. The pumphouse 30 may be located at the distal end 26D of the elongated tube 26. The pumphouse 30 may be removably connected to the distal end 26D of the elongated tube 26 at a top end 29 of the pumphouse 30. One or more delivery tubes may be inserted through the pumphouse 30 allowing for fluid communication between the delivery head 18 and spout 20 and the pumphouse 30 and container 40. Such configurations are known in the art and can include those described in U.S. Pat. No. 8,100,299 B2 to Phelps et al., which is hereby incorporated by reference.

Other operational components, according to those known in the art for use in dispenser systems, may be utilized herein. For example, the dispenser system 10 may include a pump operative to pump the liquid for dispensing to a user. The pump may be disposed in the pumphouse 30. In certain example embodiments, the pump may be operative to pump the liquid product through a fluid outlet defined in the connecting member housing surface 60.

In various example embodiments of the dispensing system 10, the pumphouse 30 may be connected to a power supply housing 50. Typically, the power supply housing 50 may be separated from the pumphouse 30 so that a power supply may be replaced when needed. That is, the power supply may be disconnectable and reconnectable to the pumphouse 30. To ensure that power is transferable from the power supply 50 to the pumphouse 30, electrical contact points may be used on both the pumphouse 30 and power supply 50, such that the electrical contact points are in complementary positions, meaning that when power supply is attached to the pumphouse 30, an electrical connection is made. Configurations for pumphouses and power supply housings are known and are shown, for example in U.S. Pat. No. 8,100,299 to Phelps et al., which is hereby incorporated by reference. In example embodiments, the motor and/or pumps included to operate the dispenser system 10 may be powered by batteries contained in a battery compartment or can be powered by an AC distribution system. If the dispenser system 10 includes batteries, a sensor can also be included for determining the power level of the batteries.

Figure 3:
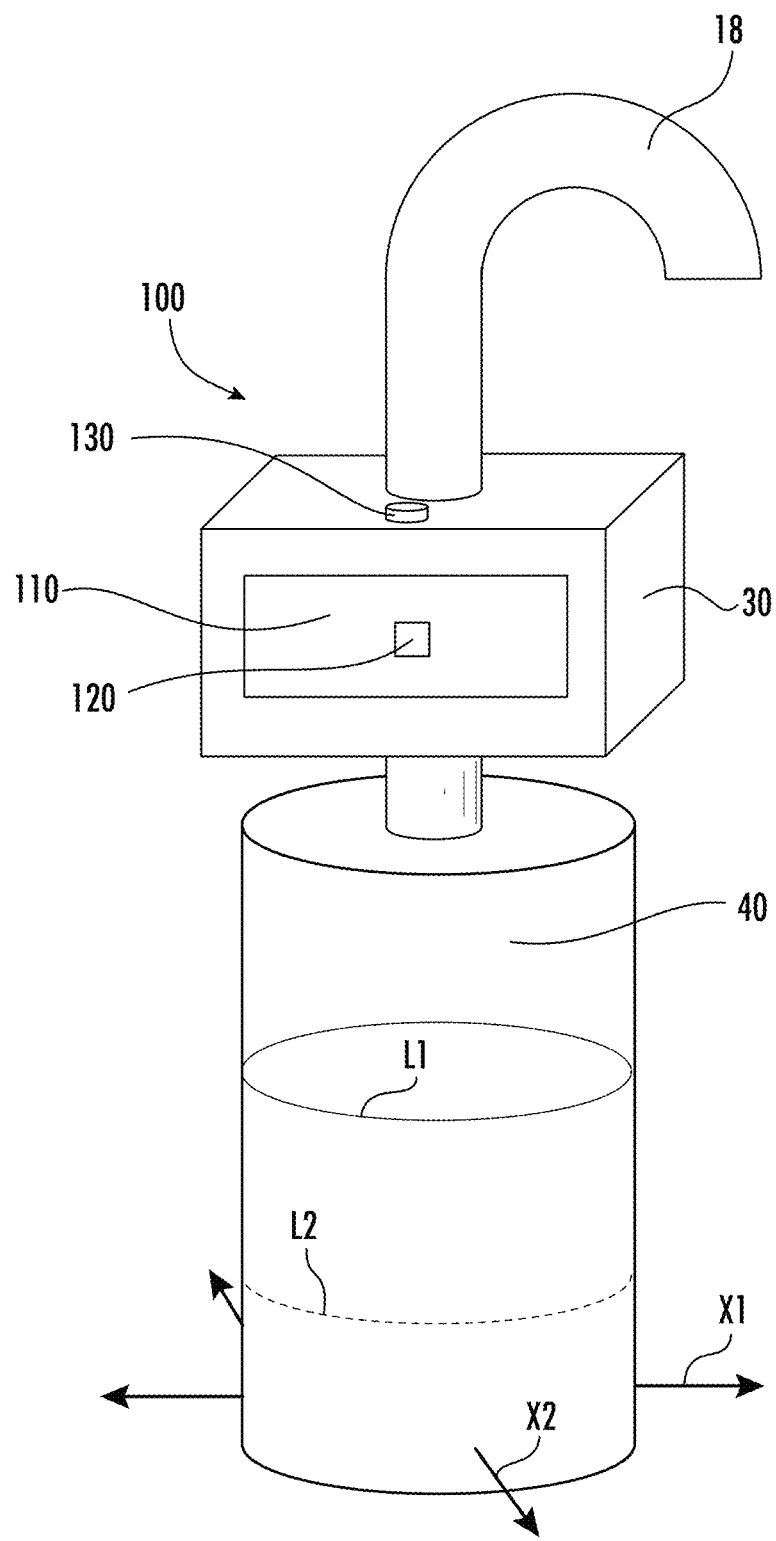
FIG. 3 is a schematic view of certain components of the example dispenser system of FIG. 1, including an accelerometer and a vibration generator.

Fill Level Detection System:

Turning now to FIG. 3, the dispenser system 10 may include a fill level detection system 100. The fill level detection system 100 may include an accelerometer 120 and a vibration generator 130. The accelerometer 120 and vibration generator 130 may both be mounted to the pumphouse 30. For instance, the accelerometer 120 and vibration generator 130 may be fixed or rigidly coupled to the pumphouse 30. Thus, e.g., the vibration generator 130 may be operable to vibrate the pumphouse 30, and the accelerometer 120 may be configured to measure acceleration of the pumphouse 30 during operation of the vibration generator 130. Thus, the accelerometer 120 may be configured to detect and measure vibrations of the pumphouse 30. The accelerometer 120 and vibration generator 130 may be adhered, fastened, clipped, or otherwise mounted to the pumphouse 30. In example embodiments, the accelerometer 120 and vibration generator 130 may be disposed within the pumphouse 30, e.g., an outer casing of the pumphouse 30.

The accelerometer 120 may output signals corresponding to the acceleration of the pumphouse 30 to the controller 110. In example embodiments, the accelerometer 120 may include a linear three-axis accelerometer. Thus, e.g., the accelerometer 120 may output a digital signal corresponding to the acceleration of the pumphouse 30 along three orthogonal axes. In the example embodiment shown in FIG. 3, the accelerometer 120 may be configured for measuring the acceleration of the pumphouse 30 along at least a first axis X1 and a second axis X2, e.g., that are coplanar with each other in a plane that is perpendicular to a vertical direction.

During operation, the vibration generator 130 may vibrate the pumphouse 30. For example, the vibration generator 130 may configured for vibrating the pumphouse 30 at one or more predetermined frequencies. Thus, e.g., the pumphouse 30 may vibrate at the one or more predetermined frequencies during operation of the vibration generator 130. In example embodiments, the vibration generator 130 may include one or more of a speaker, an eccentric rotating motor, a piezo actuator, and a linear resonant actuator.

The controller 110 may be configured for selectively activating and deactivating the accelerometer 120 and vibration generator 130. Thus, e.g., the controller 110 may activate the accelerometer 120 such that the accelerometer 120 output signals corresponding to the acceleration of the pumphouse 30. Conversely, the controller 110 may deactivate the accelerometer 120 such that the accelerometer 120 consumes significantly less power and/or does not output signals corresponding to the acceleration of the pumphouse 30. As another example, the controller 110 may activate the vibration generator 130 such that the vibration generator 130 vibrates the pumphouse 30. Conversely, the controller 110 may deactivate the vibration generator 130 such that the vibration generator 130 consumes significantly less power and/or does not vibrate the pumphouse 30.

The power consumption of the accelerometer 120 when activated may be less than when deactivated. In example embodiments, a current consumption of the accelerometer 120 may be no greater than twenty microamperes (20 µA), such as no greater than fifteen microamperes (15 µA), such as no greater than ten microamperes (10 µA), when the accelerometer 120 is activated. In example embodiments, the current consumption of the accelerometer 120 may be no greater than a half microampere (0.5 µA), such as no greater than a tenth microampere (0.1 µA), when the accelerometer 120 is deactivated. The power consumption of the vibration generator 130 when activated may be less than when deactivated. In example embodiments, a current consumption of the vibration generator 130 may be no greater than five hundred milliamperes (500 mA), such as no greater than two hundred milliamperes (200 mA), such as no greater than one hundred milliamperes (100 mA), when the vibration generator 130 is activated. In example embodiments, the current consumption of the vibration generator 130 may be no greater than a milliampere (1 mA), such as no greater than two hundred microamperes (200 µA), such as no greater than fifty microamperes (50 µA), such as no greater than a half microampere (0.5 µA), when the vibration generator 130 is deactivated.

Figure 4:
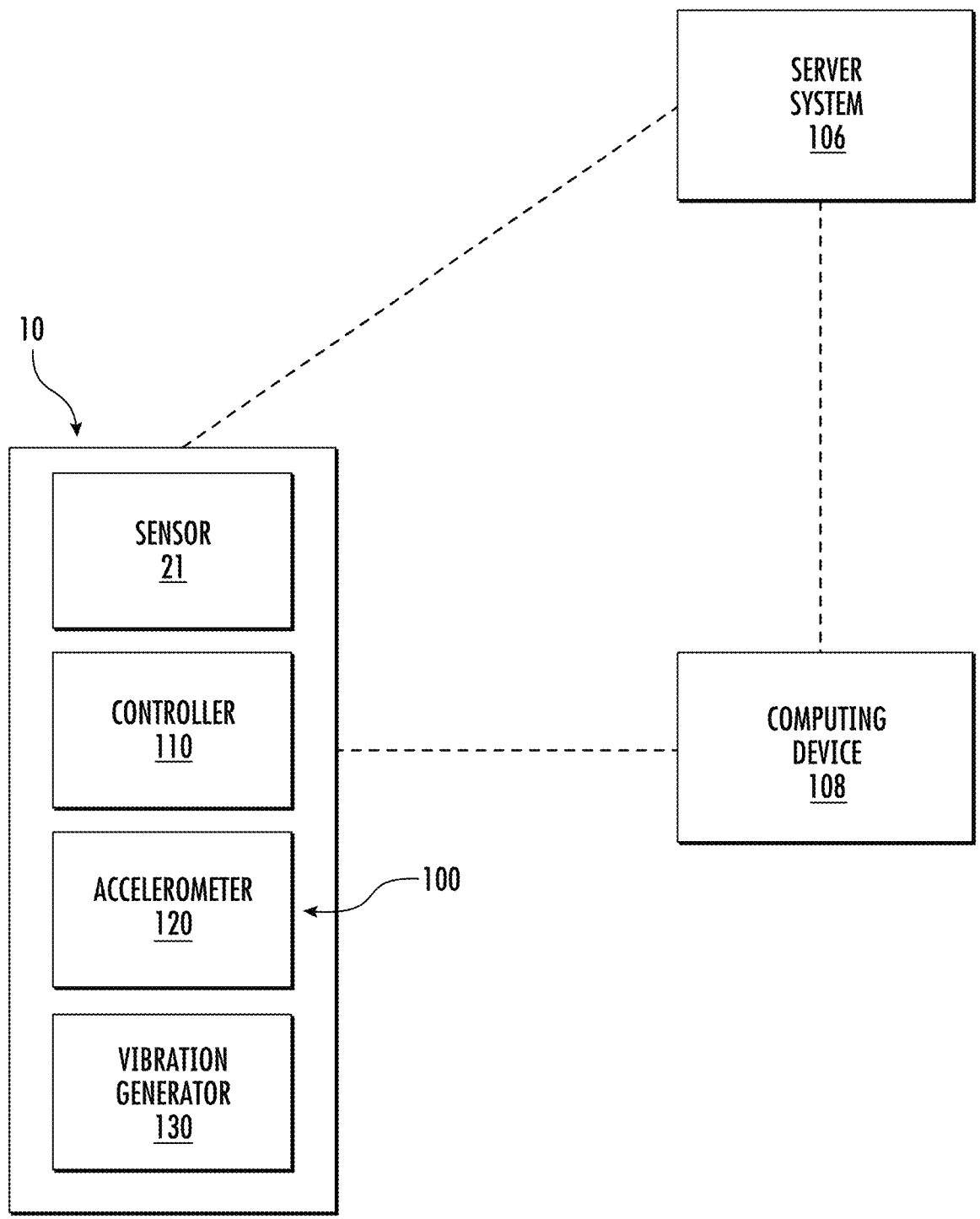
FIG. 4 is a schematic view of certain components of the example dispenser system of FIG. 1.

As shown in FIG. 4, in certain example embodiments, the dispenser system 10 may utilize the fill level detection system 100 to detect remaining liquid product and alert maintenance personnel when liquid product remaining in the container 40 is below a threshold limit (e.g., a low product condition exists). For example, the dispenser system 10 (e.g., controller 110) may be in communication with a server system 106 and/or computing system and additionally or alternatively, one or more computing devices 108. Optionally, in certain example embodiments, the dispenser system 10 may be operably in communication with the one or more computing devices 108. The dispenser system 10 may be configured to transmit the acceleration data from the accelerometer 120 to the server system 106 and/or computing devices 108. The server system 106 and/or computing devices 108 may be configured for analyzing the acceleration data from the accelerometer 120 and compute the fill level of the liquid product in the container 40. In example embodiments, the server system 106 may generate an alert and send the alert to one or more computing devices 108. The alert may correspond to instructions for maintenance personnel to service the dispenser system 10 and/or refill or replace the container 40. The alert may correspond to an email, text message, app alert, etc. The computing device 108 may include any number of peripheral mobile devices, including smartphones and tablets. In other example embodiments, the controller 110 may be configured for locally analyzing the acceleration data from the accelerometer 120 and computing the fill level of the liquid product in the container 40. The controller 110 may generate an alert and send the alert to one or more computing devices 108.

As described above, the dispenser system 10 may be operable to flow liquid product from the container 40 to the delivery head 18 and spout 20. Thus, the liquid product in the container 40 may be dispensed to the spout 20 during operation of the dispenser system 10. Moreover, a level of the liquid product in the container 40 may change as the liquid product flows from the container 40. For instance, as shown in FIG. 3, the level of the liquid product in the container 40 may decrease from a first level L1 to a second, lower level L2 after numerous dispensing numerous doses of the liquid product from the spout 20. The fill level detection system 100 may be configured for determining the fill level of the liquid product in the container 40. For instance, the fill level detection system 100 may be configured for detecting when the fill level of the liquid product in the container 40 is less than a threshold level such that the container 40 is ready for refilling to avoid emptying the container 40 of the liquid product.

The fill level detection system 100 may be configured for determining a fill level of the liquid product in the container 40 using the accelerometer 120 and vibration generator 130. Moreover, the controller 110 may activate the accelerometer 120 and the vibration generator 130. For instance, the controller 110 may periodically adjust the accelerometer 120 and the vibration generator 130 from deactivated states to activated states. The controller 110 may access acceleration data from the accelerometer 120 while the vibration generator 130 is activated to vibrate the pumphouse 30. After acquiring the acceleration data, the controller 110 may deactivate the accelerometer 120 and the vibration generator 130. In example embodiments, the controller 110 may activate the accelerometer 120 and the vibration generator 130, and then the controller 110 may deactivate the accelerometer 120 and the vibration generator 130 after acquiring the acceleration data to determine the fill level of the liquid product in the container 40.

The power consumption of the accelerometer 120 and the vibration generator 130 in the deactivated states may be significantly less than in the activated states. The controller 130 may be configured to activate the accelerometer 120 and the vibration generator 130 in order to determine the fill level of the liquid product in the container 40, and the controller 110 may be configured for otherwise keeping the accelerometer 120 and the vibration generator 130 deactivated. Such configuration can advantageously allow determining the fill level of the liquid product in the container 40 while also limiting power consumption of the fill level detection system 100.

In example embodiments, the controller 110 may activate the accelerometer 120 and the vibration generator 130 once, twice, no greater than four times, no greater than six times, no greater than twelve times, no greater than twenty-four times, over a period, such as a week, day, hour, etc. The controller 110 may keep the accelerometer 120 and the vibration generator 130 in the deactivated state when not determining the fill level of the liquid product in the container 40. The controller 110 may activate the accelerometer 120 and the vibration generator 130 for no greater than one minute (1 min), such as no greater than thirty seconds (30 sec), such as no greater than fifteen seconds (15 sec), such as no greater than five seconds (5 sec), prior to deactivating the accelerometer 120 and the vibration generator 130. As may be seen from the above, the controller 110 may be configured such that the accelerometer 120 and the vibration generator 130 are deactivated no less than six hours (6 hrs), such as no less than three hours (3 hrs), such as no less than one hour (1 hr), such as no less than thirty minutes (30 mins), such as no less than fifteen minutes (15 mins), such as no less than ten minutes (10 mins), prior to activating the accelerometer 120 and the vibration generator 130.

The acceleration data from the accelerometer 120 may be analyzed to determine the fill level of the liquid product in the container 40. For instance, the accelerometer 120 may be analyzed by one or more of the server system 106, the computing devices 108, and the controller 110 to determine the fill level of the liquid product in the container 40. In example embodiments, the acceleration data from the accelerometer 120 may be transmitted to the cloud for analysis by the server system 106. The server system 106 may process the acceleration data and utilize a machine learned model to output a fill level prediction for the liquid product in the container 40. The machine learned model may be trained on a variety of acceleration data, and the machine learned model may be configured to analyze many parts of the acceleration data, such as frequency, amplitude, peak to peak distance, minimum and maximum acceleration, consistency of the acceleration pattern, Fast Fourier Transform patterns, and other values and/or combinations of values.

Figure 6:
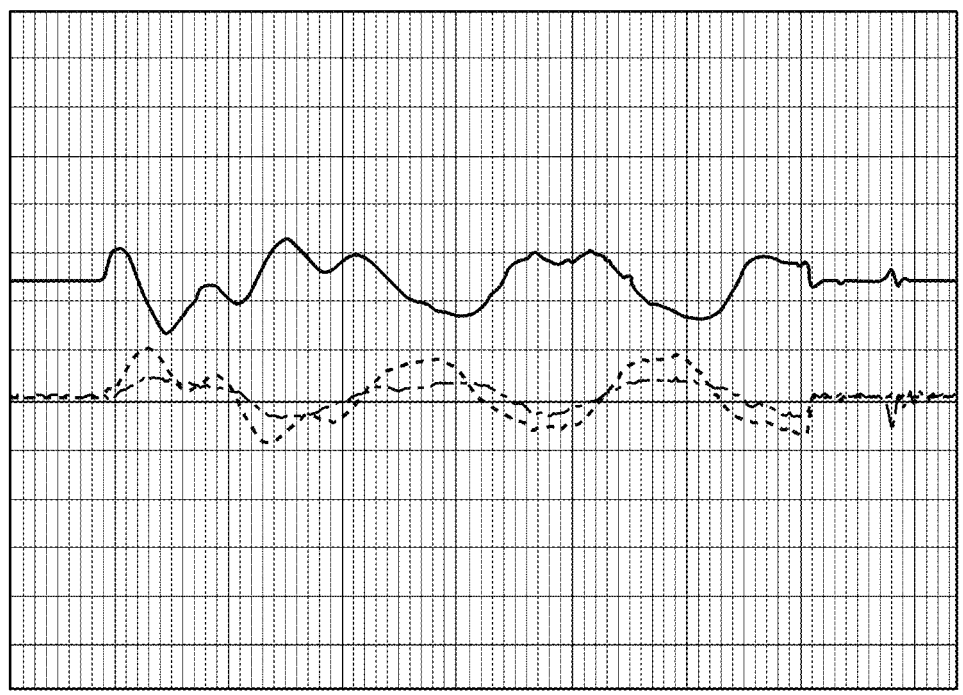
FIG. 6 is a plot of acceleration data from an accelerometer with a container at a first fill level according to example aspects of the present disclosure.
Figure 7:
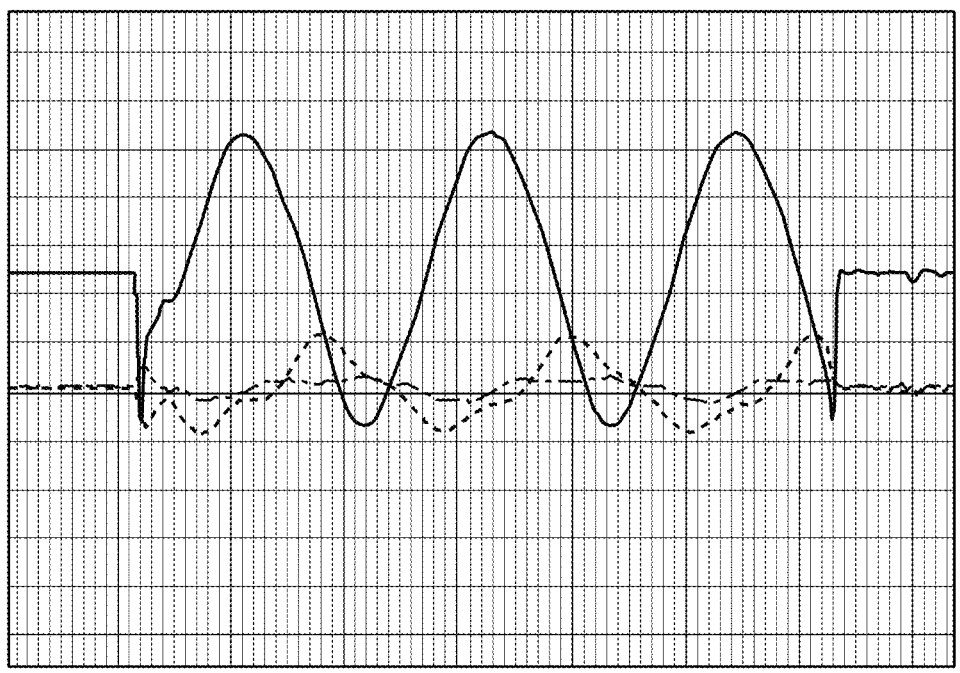
FIG. 7 is a plot of acceleration data from the accelerometer with the container at a second fill level according to example aspects of the present disclosure.

FIG. 6 shows example acceleration data from the accelerometer 120 when the container 40 is filled with the liquid product to about ten percent (10%) of an original fill level of the container 40, e.g., such that the container 40 is almost empty and ready for refilling. FIG. 7 shows other example acceleration data from the accelerometer 120 when the container 40 is filled with the liquid product to about one hundred percent (100%) of the original fill level of the container 40, e.g., such that the container 40 is filled. In FIGS. 6 and 7, acceleration data for three axes of the accelerometer 120 is shown, and the significant difference between the acceleration data between the different fills states of the container 40 may be observed. Moreover, a machine learned model may be trained to analyze the acceleration data to detect the different acceleration data from the accelerometer 120 when the container 40 is filled with the liquid product to about ten percent (10%) of the original fill level of the container 40 as compared to when the container 40 is filled with the liquid product to about one hundred percent (100%) of the original fill level of the container 40.

Without wishing to be bound to a particular theory, it is believed that the change in the acceleration data from the accelerometer 120 (e.g., due to the change in the vibration pattern as the product level changes in the container 40) is due to the weight of the container 40 changing. When there is more fluid inside the container 40, the container 40 can more easily transmit vibrations during operation of the vibration generator 130 because the container 40 has more mass due to a higher liquid to air ratio. This will cause the container 40 to swing back and forth more because vibrations travel better through liquids. When the container 40 is nearing empty, there will not be as much movement of the container 40 because the container 40 will not weigh as much due to a higher volume of air than liquid. This means the vibrations will not travel through the system as well and the patterns of the vibrations will change. As may be seen from the above, the fill level detection system 100 may advantageously use the accelerometer 120 and the vibration generator 130 on the pumphouse 30 to detect the product level of the container 40 despite the container 40 being a separate component and removable from the pumphouse 30.

In example embodiments, the accelerometer 120 and vibration generator 130 may be activated periodically to gather the acceleration data and determine the product level of the container 40 and may otherwise remain deactivated to conserve power. For example, the accelerometer 120 and vibration generator 130 may automatically activated no less than every thirty minutes (30 mins), such as no less than every hour (1 hr), such as no less than every six hours (6 hrs), such as no less than every twelve hours (12 hrs), such as no less than every twenty-four hours (24 hrs), or other selected time periods. In other example embodiments, the accelerometer 120 and vibration generator 130 may be activated on demand, e.g., in response to a query from maintenance personnel via one of the computing devices

108 (FIG. 4). Thus, e.g., maintenance personnel may utilize one of the computing devices 108 to initiate operation of the fill level detection system 100. In such example embodiments, maintenance personnel may advantageously remotely monitor the product level of the container 40 and power consumption of the fill level detection system 100 may be limited to the needs of the maintenance personnel.

Figure 5:
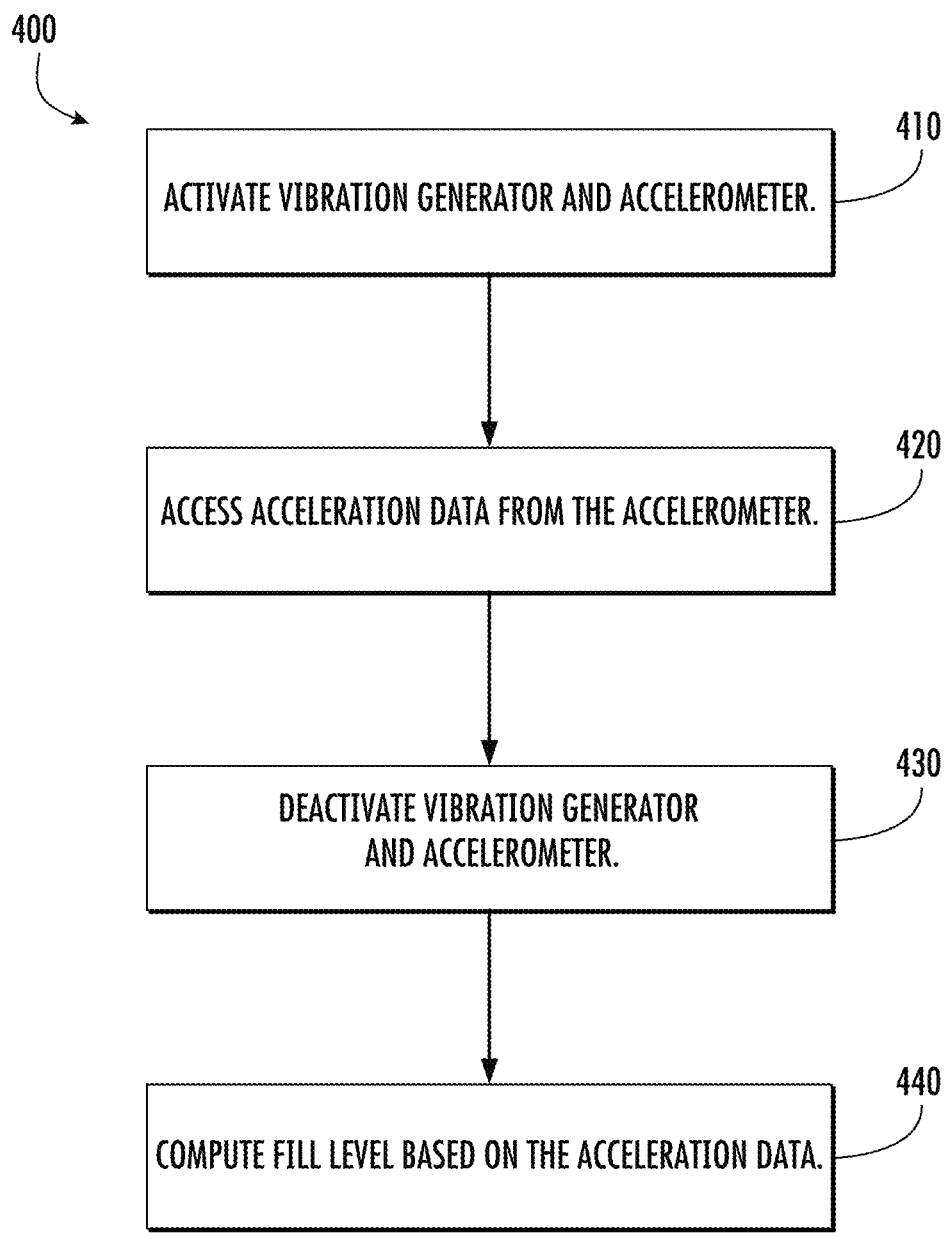
FIG. 5 is a flow chart of a method for detecting a fill level of a dispenser system according to example aspects of the present disclosure.

Fill Level Detection Method:

FIG. 5 illustrates a method 400 for fill level detection according to an example embodiment of the present subject matter. Method 400 is described in greater detail below in the context of the dispenser system 10. However, it will be understood that method 400 may be used in or with other dispenser systems in other example embodiments.

At 410, a vibration generator and an accelerometer mounted to a pumphouse may be activated. As an example, the controller 110 may activate the accelerometer 120 and the vibration generator 130 at 410. Prior to 410, the vibration generator and accelerometer may both be deactivated such that the vibration generator and accelerometer consume less power prior to activation at 410. The vibration generator and accelerometer may be deactivated for a significant period prior to activation at 410. For instance, the vibration generator and accelerometer may be deactivated no less than twenty-four hours (24 hrs), such as no less than twelve hours (12 hrs), such as no less than six hours (6 hrs), such as no less than two hours (2 hrs), such as no less than one hour (1 hr), such as no less than thirty minutes (30 mins), such as no less than fifteen mins (15 mins), such as no less than ten mins (10 mins), prior to activation at 410.

At 420, the acceleration data from the accelerometer may be accessed. For instance, the controller 110 may receive the acceleration data from the accelerometer 120 at 420. Due to the vibration generator being activated, the acceleration data from the accelerometer may correspond to the accelerations or vibrations of the pumphouse. A container coupled to the pumphouse may include liquid product for dispensing. Over time, the fill level of the liquid product in the container changes as the liquid product is dispensed. The changing mass of container as the liquid product is dispensed from the container may cause the acceleration data from the accelerometer to change between instances of activating the vibration generator and accelerometer.

At 430, the vibration generator and accelerometer may be deactivated. As an example, the controller 110 may deactivate the accelerometer 120 and the vibration generator 130 at 430. Thus, after accessing the acceleration data from the accelerometer, the vibration generator and accelerometer may be deactivated at 430. Between 410 and 430, the vibration generator and accelerometer may be activated for a relatively small time period in some example embodiments. For instance, the vibration generator and accelerometer may be activated no greater than five minutes (5 mins), such as no greater than two minutes (2 mins), such as no greater than one minute (1 min), such as no greater than thirty seconds (30 secs), such as no greater than fifteen seconds (15 secs), such as no greater than ten seconds (10 secs), such as no greater than five seconds (5 secs), between activation at 410 and deactivation at 430. Such activation and deactivation of the vibration generator and accelerometer may advantageously allow for, e.g., periodic or on-demand, collection of the acceleration data from the accelerometer while also limiting power consumption of the vibration generator and accelerometer.

At 440, a fill level of the liquid product in the container may be computed based on the acceleration data. For example, one or more of the server system 106, the computing devices 108, and the controller 110 may analyze the acceleration data from the accelerometer 120 to determine the fill level of the liquid product in the container 40. In example embodiments, the acceleration data from the accelerometer may be transmitted to the cloud for analysis by a server system. The server system may process the acceleration data and utilize a machine learned model to output a fill level prediction for the liquid product in the container. The machine learned model may be configured to analyze parts of the acceleration data, such as frequency, amplitude, peak to peak distance, minimum and maximum acceleration, consistency of the acceleration pattern, Fast Fourier Transform patterns, and other values and/or combinations of values.

Method 400 may also include transmitting instructions for servicing the container based on the fill level of the fluid in the container. For example, the server system 106, computing devices 108, and/or controller 110 may generate an alert when the computed fill level is less than a threshold amount and send the alert to one or more computing devices 108. The alert may correspond to instructions for maintenance personnel to refill or replace the container due to the low fill level. The alert may correspond to an email, text message, app alert, etc.

FIG. 5 depicts steps performed in a particular order for purposes of illustration and discussion. Those of ordinary skill in the art, using the disclosures provided herein, will understand that the steps of any of the methods discussed herein may be adapted, rearranged, expanded, omitted, or modified in various ways without deviating from the scope of the present disclosure.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

EXAMPLE EMBODIMENTS

First example embodiment: A fill level detection system, comprising: a pumphouse; a container connectable to the pumphouse such that the pumphouse is operable to pump fluid from the container to a dispenser; a vibration generator mounted to the pumphouse, the vibration generator operable to vibrate the pumphouse; an accelerometer mounted to the pumphouse, the accelerometer configured to measure acceleration of the pumphouse; and a controller in signal communication with the vibration generator and the accelerometer, the controller configured for activating the vibration generator and the accelerometer, accessing acceleration data for the pumphouse, the acceleration data corresponding to when the vibration generator is activated to vibrate the pumphouse, deactivating the vibration generator and the accelerometer, and transmitting the acceleration data for analysis to compute a fill level of the fluid in the container.

Second example embodiment: The fill level detection system of the first example embodiment, wherein the vibration generator and the accelerometer are disposed within the pumphouse.

Third example embodiment: The fill level detection system of either the first example embodiment or the second example embodiment, wherein an interior volume of the container is no greater than two liters.

Fourth example embodiment: The fill level detection system of any one of the first through third example embodiments, wherein the vibration generator comprises one or more of a speaker, an eccentric rotating motor, a piezo actuator, and a linear resonant actuator.

Fifth example embodiment: The fill level detection system of any one of the first through fourth example embodiments, wherein the accelerometer comprises a linear three-axis accelerometer.

Sixth example embodiment: The fill level detection system of any one of the first through fifth example embodiments, wherein: a current consumption of the accelerometer is no greater than twenty microamperes when the accelerometer is activated; and the current consumption of the accelerometer is no greater than half of a microampere when the accelerometer is deactivated.

Seventh example embodiment: The fill level detection system of any one of the first through sixth example embodiments, wherein the controller is configured such that the vibration generator and the accelerometer are deactivated no less than ten minutes prior to activating the vibration generator and the accelerometer.

Eighth example embodiment: The fill level detection system of any one of the first through seventh example embodiments, wherein the controller is configured such that the vibration generator and the accelerometer are activated no greater than thirty seconds prior to deactivating the vibration generator and the accelerometer.

Nineth example embodiment: The fill level detection system of any one of the first through eighth example embodiments, wherein the controller is configured to transmit the acceleration data to a remote computing device, and the remote computing device is configured for computing the fill level of the fluid in the container based on the acceleration data.

Tenth example embodiment: The fill level detection system of any one of the first through nineth example embodiments, wherein the remote computing device is configured for transmitting instructions for servicing the container based on the fill level of the fluid in the container.

Eleventh example embodiment: A method for fill level detection, comprising: activating a vibration generator and an accelerometer mounted to a pumphouse, the pumphouse is operable to pump fluid from a container to a dispenser on the countertop; accessing acceleration data for the pumphouse from the accelerometer while the vibration generator is activated to vibrate the pumphouse; deactivating the vibration generator and the accelerometer; and computing, based on the acceleration data, a fill level of the fluid in the container.

Twelfth example embodiment: The method of the eleventh example embodiment, wherein the vibration generator and the accelerometer are disposed within the pumphouse.

Thirteenth example embodiment: The method of any one of the eleventh example embodiment or the twelfth example embodiment, wherein an interior volume of the container is no greater than two liters.

Fourteenth example embodiment: The method of any one of the eleventh through thirteenth example embodiments, wherein the vibration generator comprises one or more of a speaker, an eccentric rotating motor, a piezo actuator, and a linear resonant actuator.

Fifteenth example embodiment: The method of any one of the eleventh through fourteenth example embodiments, wherein the accelerometer comprises a linear three-axis accelerometer.

Sixteenth example embodiment: The method of any one of the eleventh through fifteenth example embodiments, wherein: a current consumption of the accelerometer is no greater than twenty microamperes when the accelerometer is activated; and the current consumption of the accelerometer is no greater than half of a microampere when the accelerometer is deactivated.

Seventeenth example embodiment: The method of any one of the eleventh through sixteenth example embodiments, wherein the vibration generator and the accelerometer are deactivated no less than ten minutes prior to activating the vibration generator and the accelerometer.

Eighteenth example embodiment: The method of any one of the eleventh through seventeenth example embodiments, wherein the vibration generator and the accelerometer are activated no greater than thirty seconds prior to deactivating the vibration generator and the accelerometer.

Nineteenth example embodiment: The method of any one of the eleventh through eighteenth example embodiments, further comprising transmitting the acceleration data to a remote computing device, wherein the remote computing device computes the fill level of the fluid in the container based on the acceleration data.

Twentieth example embodiment: The method of any one of the eleventh through nineteenth example embodiments, further comprising transmitting instructions for servicing the container based on the fill level of the fluid in the container.

What is claimed:
1. A fill level detection system, comprising:
a pumphouse;
a container connectable to the pumphouse such that the pumphouse is operable to pump fluid from the container to a dispenser;
a vibration generator mounted to the pumphouse, the vibration generator operable to vibrate the pumphouse;
an accelerometer mounted to the pumphouse, the accelerometer configured to measure acceleration of the pumphouse; and
a controller in signal communication with the vibration generator and the accelerometer, the controller configured for
activating the vibration generator and the accelerometer,
accessing acceleration data for the pumphouse, the acceleration data corresponding to when the vibration generator is activated to vibrate the pumphouse,
deactivating the vibration generator and the accelerometer, and
transmitting the acceleration data for analysis to compute a fill level of the fluid in the container.

2. The fill level detection system of claim 1, wherein the vibration generator and the accelerometer are disposed within the pumphouse.

3. The fill level detection system of claim 1, wherein an interior volume of the container is no greater than two liters.

4. The fill level detection system of claim 1, wherein the vibration generator comprises one or more of a speaker, an eccentric rotating motor, a piezo actuator, and a linear resonant actuator.

5. The fill level detection system of claim 1, wherein the accelerometer comprises a linear three-axis accelerometer.

6. The fill level detection system of claim 1, wherein:
a current consumption of the accelerometer is no greater than twenty microamperes when the accelerometer is activated; and
the current consumption of the accelerometer is no greater than half of a microampere when the accelerometer is deactivated.

7. The fill level detection system of claim 1, wherein the controller is configured such that the vibration generator and the accelerometer are deactivated no less than ten minutes prior to activating the vibration generator and the accelerometer.

8. The fill level detection system of claim 1, wherein the controller is configured such that the vibration generator and the accelerometer are activated no greater than thirty seconds prior to deactivating the vibration generator and the accelerometer.

9. The fill level detection system of claim 1, wherein the controller is configured to transmit the acceleration data to a remote computing device, and the remote computing device is configured for computing the fill level of the fluid in the container based on the acceleration data.

10. The fill level detection system of claim 9, wherein the remote computing device is configured for transmitting instructions for servicing the container based on the fill level of the fluid in the container.

11. A method for fill level detection, comprising:
activating a vibration generator and an accelerometer mounted to a pumphouse, the pumphouse is operable to pump fluid from a container to a dispenser on the countertop;
accessing acceleration data for the pumphouse from the accelerometer while the vibration generator is activated to vibrate the pumphouse;
deactivating the vibration generator and the accelerometer; and
computing, based on the acceleration data, a fill level of the fluid in the container.

12. The method of claim 11, wherein the vibration generator and the accelerometer are disposed within the pumphouse.

13. The method of claim 11, wherein an interior volume of the container is no greater than two liters.

14. The method of claim 11, wherein the vibration generator comprises one or more of a speaker, an eccentric rotating motor, a piezo actuator, and a linear resonant actuator.

15. The method of claim 11, wherein the accelerometer comprises a linear three-axis accelerometer.

16. The method of claim 11, wherein:
a current consumption of the accelerometer is no greater than twenty microamperes when the accelerometer is activated; and
the current consumption of the accelerometer is no greater than half of a microampere when the accelerometer is deactivated.

17. The method of claim 11, wherein the vibration generator and the accelerometer are deactivated no less than ten minutes prior to activating the vibration generator and the accelerometer.

18. The method of claim 11, wherein the vibration generator and the accelerometer are activated no greater than thirty seconds prior to deactivating the vibration generator and the accelerometer.

19. The method of claim 11, further comprising transmitting the acceleration data to a remote computing device, wherein the remote computing device computes the fill level of the fluid in the container based on the acceleration data.

20. The method of claim 19, further comprising transmitting instructions for servicing the container based on the fill level of the fluid in the container.

* * * * *